United States Patent [19]

Pascale et al.

[11] Patent Number: 4,750,854
[45] Date of Patent: Jun. 14, 1988

[54] HANDLING APPARATUS FOR THE TRANSFER OF SHEETS OF GLASS

[75] Inventors: Carmine Pascale, Chieti; Piero Vercellino, Turin, both of Italy

[73] Assignee: Societa' Italiana Vetro Siv S.p.A., Vasto Ch, Italy

[21] Appl. No.: 923,171

[22] Filed: Oct. 24, 1986

[30] Foreign Application Priority Data

Nov. 7, 1985 [IT] Italy .............................. 48752 A/85

[51] Int. Cl.⁴ ............................................ B65G 49/06
[52] U.S. Cl. .................................. 414/107; 414/737; 414/738; 414/783
[58] Field of Search ................ 271/185, 215; 414/107, 414/330, 47, 97, 225, 733, 734, 736, 737, 738, 783, 100

[56] References Cited

U.S. PATENT DOCUMENTS

| | | | |
|---|---|---|---|
| 3,279,664 | 10/1966 | Lynch | 414/330 X |
| 3,336,860 | 8/1967 | Sawyer et al. | 414/107 X |
| 3,682,329 | 8/1972 | Dean | 414/43 X |
| 3,836,018 | 9/1974 | Dawson et al. | 414/47 X |
| 3,934,871 | 1/1976 | Dean | 414/107 X |
| 4,431,358 | 2/1984 | Jenkner | 414/100 X |
| 4,444,537 | 4/1984 | Werner | 414/330 X |
| 4,643,633 | 2/1987 | Lashyro | 414/736 X |

FOREIGN PATENT DOCUMENTS

| | | | |
|---|---|---|---|
| 18663 | 2/1977 | Japan | 414/783 |
| 156112 | 12/1980 | Japan | 414/97 |

Primary Examiner—Frank E. Werner
Assistant Examiner—Janice Krizek
Attorney, Agent, or Firm—Browdy and Neimark

[57] ABSTRACT

Handling apparatus for the transfer of sheets, particularly of glass, from a horizontal conveyor belt to a container for vertical sheets and vice versa, comprising a rotating and translating device having transfer arms rotating by about 170°, supporting a counter rotating shaft, which supports a frame provided with suction pads, as well as a carriage which supports the container, the container being moved into the required exact loading/unloading relationship by the action of a feeling device which detects the position of the last sheet in the container.

5 Claims, 5 Drawing Sheets

HANDLING APPARATUS FOR THE TRANSFER OF SHEETS OF GLASS

BACKGROUND OF THE INVENTION

1. Field of the Invention

The present invention relates to an apparatus for loading or unloading flat sheets of any material, which can be advantageously used for loading or unloading and stacking flat sheets of glass.

2. Description of the Prior Art

Loading or unloading of sheets of glass is required when beginning, ending or in the intermediate steps of a manufacturing operation which transforms the sheets into window panes for motor vehicles or buildings.

Generally, unloading is carried out together with transfer of a sheet of glass from a horizontal position on a conveyor belt to a vertical or near vertical position in a container, whereas the loading is carried out simultaneously to the transfer in the opposite direction.

It is necessary that the movement of the loading-unloading machine be smooth, so as to avoid breakage of the sheets, precise so as to avoid harmful errors of positioning, speedy so as to meet with the manufacturing line times, and reliable so as to avoid expensive interruptions of production.

Moreover, it is desirable that the loading or unloading machine be easily adjustable for different sizes and thicknesses of sheets and especially for different dimensions and shapes of the containers in which said sheets have to be stacked.

The above mentioned requirements are advantageously met using the loading-unloading apparatus which is the object of the present invention.

SUMMARY OF THE INVENTION

The apparatus according to the invention comprises two arms, the reciprocating rotary motion of which is controlled by a gear system arranged so as to permit a smooth movement with no jerking, especially upon starting and stopping of said arms.

A feeler measures the thickness of the pack of sheets in the container and adjust the position thereof with respect to the stroke of the arms, so as to permit a precise taking off or laying down of the sheet.

The loading or unloading platform is arranged so as to be able to contain various models of container. This necessity arises when the origin or the destination of the containers are variable.

The platform has at least two containers set side by side, so that stopping is not necessary when a loaded container has to be removed.

An object of the present invention is to provide an apparatus for the transfer of sheets from a conveyor of horizontally laid sheets to a container of vertically set sheets, including a rotating and translating transfer device mounted on a fixed basement for the transfer of sheets from the container to the conveyor and vice versa, and a carriage for moving the container into a loading or unloading relationship with respect to the rotating and translating device. The rotating and translating device comprises: a first rotating shaft having thereon a pair of parallel transfer arms; a second shaft pivotally secured to the ends of the arms; a frame supported on the second shaft, provided with suction devices for the support of one of the sheets, the second shaft being controlled by a chain drive receiving the rotary movement from the arms, so that upon rotation of the arms, the second shaft rotates in the opposite direction with respect to the first shaft; and a feeling device secured to the basement to detect the position of the sheet supported by the suction devices within the container. The carriage comprises a moveable bearing table for the container, driven by a screw drive operated by a motor controlled by the feeling device, in order to shift the bearing table by a displacement equal to the thickness of the sheet to be loaded or unloaded in order to maintain the sheet in the required loading or unloading relationship to the rotating and translating device.

BRIEF DESCRIPTION OF THE DRAWINGS

The invention will be described in greater detail in the following with reference to the drawings which represent an example of an embodiment of the invention. In the drawings.

DESCRIPTION OF THE PREFERRED EMBODIMENT

Figure 1:
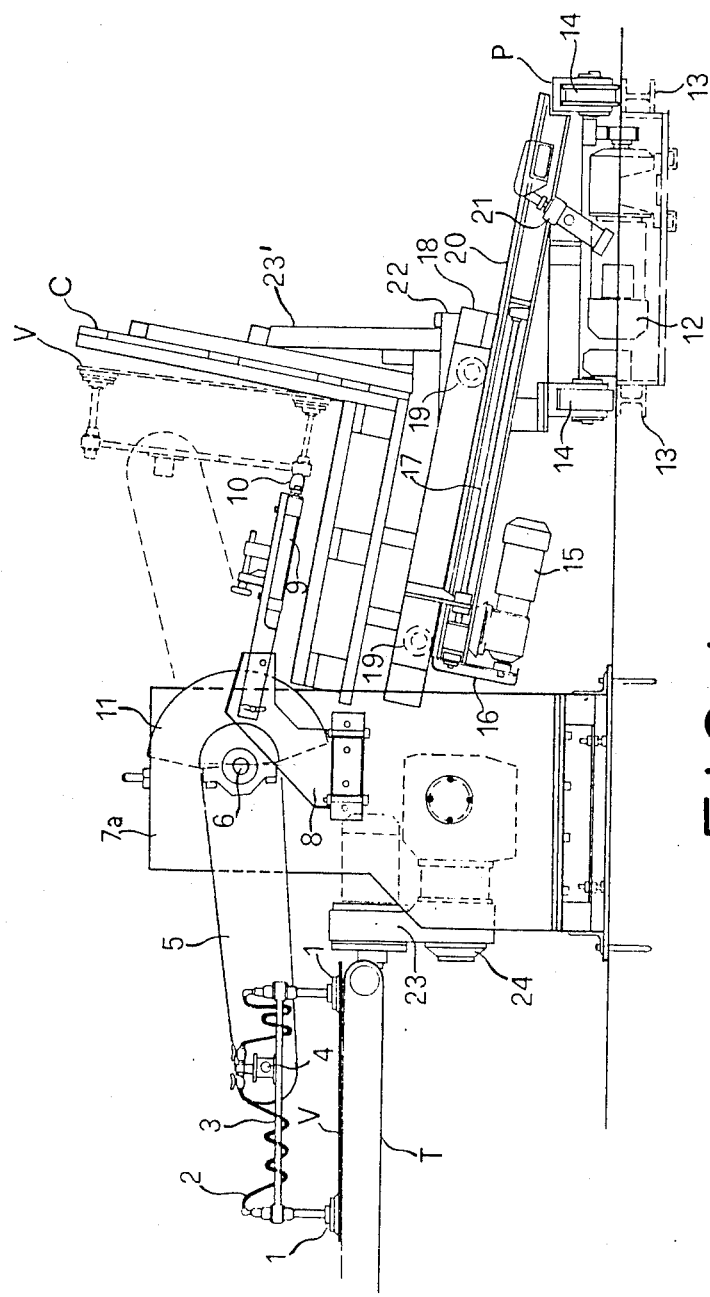
FIG. 1 shows an overall view of the loading-unloading apparatus according to the invention.

According to the present invention, and assuming that the machine operates as an unloading apparatus, the sheet of glass V coming from the manufacturing machine line, is conveyed by a conveyor belt T to a parking station.

Suction pads 1 are applied to the sheet V and suction is created through conduits 2 so as to permit holding of the sheet.

Suction pads 1 are provided in a sufficient number to ensure support of the sheet V of glass and are supported on a frame 3 integral with a shaft 4 which is also pivotally secured on transfer arms 5 for the rotation and transportation of the sheets. The arms 5 are mounted at the ends of a rotating shaft 6 and perform a rotation of about 170°, transferring the flat sheet V from the horizontal conveyor T to a container C.

Figure 2:
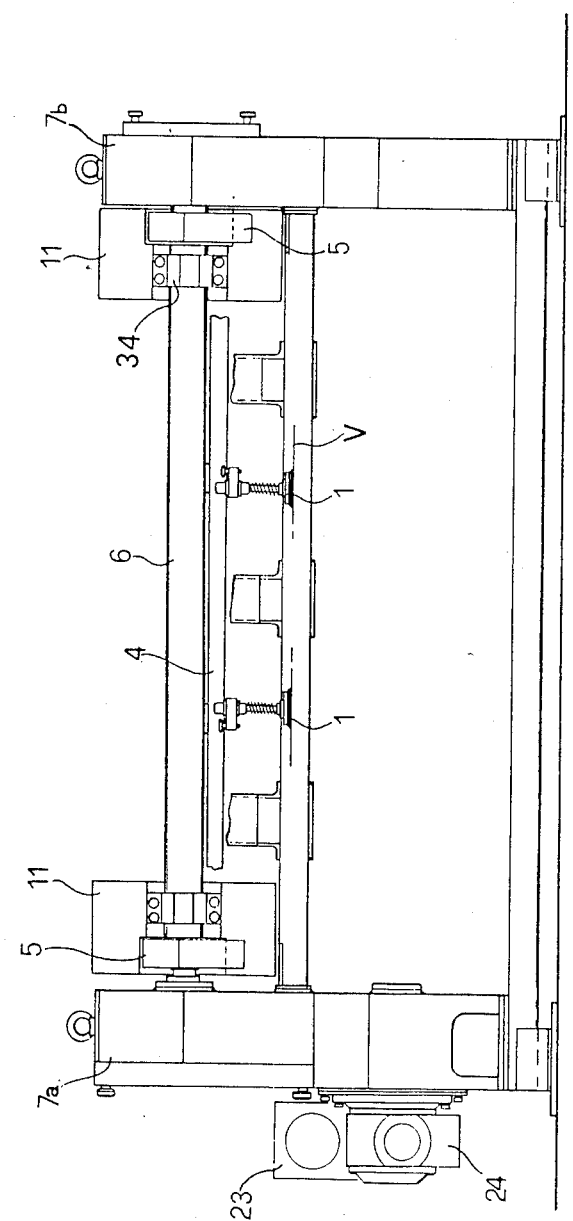
FIG. 2 shows a front view of the apparatus illustrated in FIG. 1.
Figure 5:
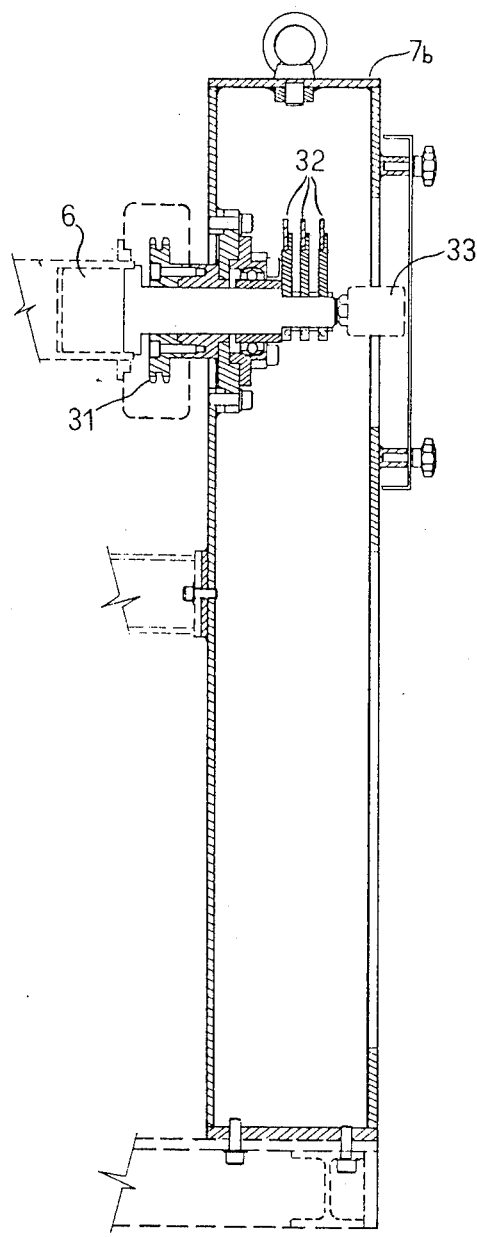
FIG. 5 shows a vertical cross-section of the mechanical unit for the control of the rotational movements.

Counterweights 11, connected to the shaft 6 by means of a flange 34 (FIG. 2) are provided to balance the forces involved during rotation of the arms 5. During the rotation, the frame 3 which is integral with the shaft 4, is rotated in an anticlockwise direction (as seen in FIG. 1) by means of a chain drive, not illustrated in the drawings, which is engaged with a pair of sprocket wheels, one of a lesser diameter, fixed on shaft 4 and the other of a greater diameter, fixed on basement 7b, as indicated in FIG. 5, and freely rotatable to shaft 6, so that sheet V gradually passes from a horizontal position on the belt T to the required vertical position.

On basement 7a a metal arm 8 is secured which supports a piston 9 whose rod has on the free end thereof a feeler 10, the function of which is to control the position of the container C with respect to the thickness of the sheet pack.

The container C lies on a bearing table 18 which slides, through wheels 19, in the unloading direction on a support platform 20. The bearing table 18 is engaged with the end of a screw 17, the other end of which is engaged with the chain 16 and the motor 15. When a sheet V is laid in the container C by the suction pads 1, the rod of piston 9 pushes the feeler 10 to meet the sheet surface.

When the progress of the rod of piston 9 is hindered due to the presence of sheet V, an electrical device, not illustrated in the drawings, starts the motor 15 which rotates the screw 17.

Consequently the table 18 will slide along the platform 20 for a distance such as to permit the rod of the piston 9 to complete its stroke. At this point the same electrical device will send a stop signal to the motor 15.

This operation is repeated for each sheet to be loaded, allowing the container C to be placed at all times in the most favorable position for a precise stacking of the pack of sheets. The platform 20 in turn is supported on a carriage P and secured thereto by a hinge, not illustrated in the drawings.

A piston 21 is provided to control the tilting of platform 20 with respect to the horizontal line.

The capacity to control tilting of platform 20 and consequently of table 18 lying on it, allows the use of different sizes and shapes of containers so that the necessity of providing only one standard model is avoided.

Moreover, on table 18, chutes 22 are provided on which means 23' can be inserted in order to make possible the use of particular forms of containers.

Figure 3:
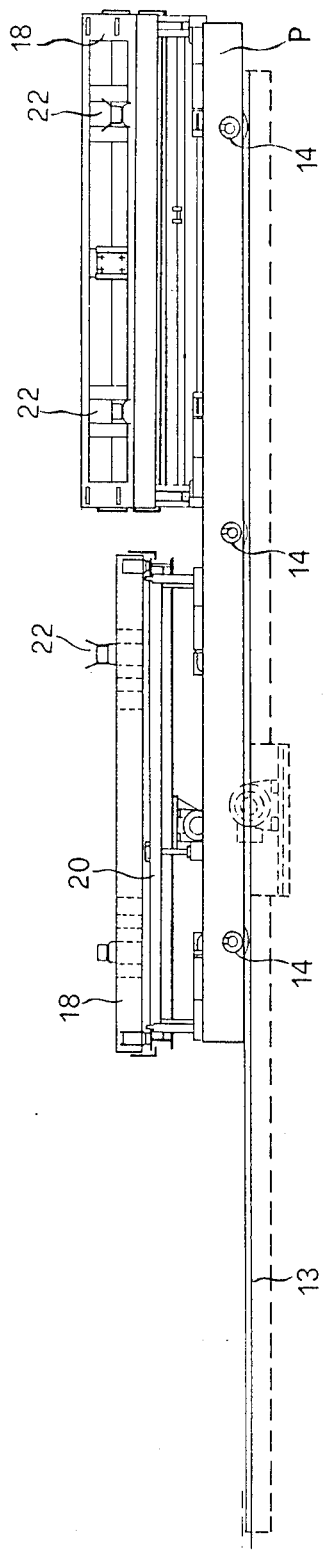
FIG. 3 shows a front view of the carriage and the loading-unloading platform.

In order to better describe the container-carrying platform, a front view thereof is illustrated in FIG. 3, which shows on the left side a loading platform 20 in a horizontal position and on the right side the platform 20 tilted by about 10° from the horizontal.

The carriage P slides on guides 13 through wheels 14 moved by a motor 12 by means of a rack and pinion gear, to bring the support platform 20 into the operating position in front of the unloading machine.

The apparatus of the present invention is also characterized by a smooth and precise operation.

This is obtained by means of a particular gear and control system which is hereinafter described.

Basement 7a and 7b supports the transfer arms 5. Within the column 7a gears are housed for the transmission of the rotary motion to the arms 5, while in the column 7b cams are housed for the control of the same motion, which are described in greater detail hereinafter with reference to FIG. 5.

A motor 23 transmits a continuous rotary motion to a shaft 25, through a speed variator 24.

Figure 4:
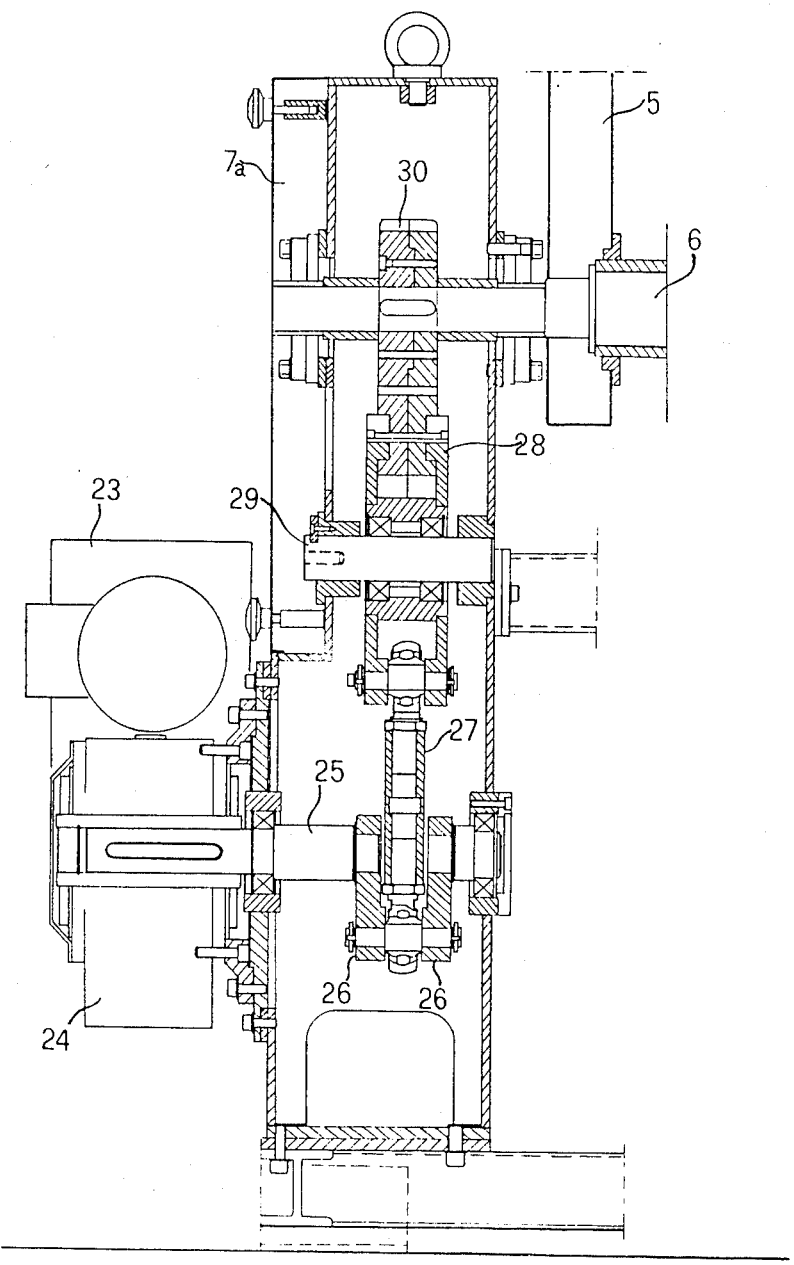
FIG. 4 shows a vertical cross-section of the gear unit for the driving of the loading-unloading arms.

On the shaft 25 is mounted a crank and connecting rod system 26, 27 (FIG. 4), which transmits the motion to a sector gear 28 mounted on a pivot 29 which, in turn, transmits the motion to a gear wheel 30 mounted on the shaft 6.

The sector gear 28 is moved in a reciprocating rotary motion with a swinging angle of about 85°. Said sector is in a transmission ratio of 1:2 with the gear wheel 30 which in turn is moved in a reciprocating rotary motion with a swinging angle of about 170°.

The gear wheel 30 has a herring bone toothing for a smooth and continuous tooth engagement.

Mechanical control means are housed in the column 7b for the control of the movements.

A gear wheel 31 (FIG. 5) is provided for control of the rotation angle of the shaft 4, which rotates in the opposite direction with respect to the arms 5.

Cams 32 secured to the shaft 6, control, through electrical devices not illustrated in the drawings, the range of the rotation angle of the arms 5, the cutting off of suction for the release of a sheet V from suction pads 1, and the extension of the rod of piston 9 to control shifting of table 18 by an advancement equal to the thickness of sheet V.

To the shaft 6, which is hollow throughout its length, a rotating coupling 33 is connected which puts a suction pump into communication with pipes 2 of suction pads 1.

While the invention has been described in one detailed embodiment thereof, it is understood that changes and modifications can be envisaged within the scope of the same invention.

We claim:

1. A handling apparatus for the transfer of sheets from a conveyor containing horizontally laid sheets to a container of vertically set sheets, consisting of a rotating and translating transfer device mounted on a fixed basement for transfer of said sheets between said container and said conveyor, and a carriage to move said container into a loading or unloading relationship with respect to said rotating and translating device, in which said rotating and translating device has a first rotating shaft having thereon a pair of parallel transfer arms; and a second shaft pivotally secured to the ends of said arms; a frame supported on said second shaft, said frame including suction means for supporting one of said sheets, comprising:

said transfer arms being integral with said first shaft, and a gear wheel mounted on said first shaft;

said gear wheel being engaged with a sector gear;

said sector gear being driven by a unit formed by a crank and connecting rod system;

said crank and connecting rod system driven by a motor;

a drive receiving the rotary movement from said arms, said drive controlling said second shaft so that upon rotation of said arms, said second shaft rotates in a direction opposite to the direction of rotation of said first shaft;

a feeling device secured to said basement to detect the position in said container of the sheet pack thereon;

a movable bearing table for said container on said carriage; and a screw drive for driving said movable bearing table, said screw drive operated by a motor controlled by said feeling means, whereby said bearing table is shifted by a displacement equal to the thickness of the sheet to be loaded or unloaded, in order to maintain said container in the required loading or unloading relationship to the rotating and translating device.

2. Apparatus according to claim 1 wherein said carriage comprises a supporting platform which can be tilted with respect to the carriage by means of a pneumatic piston and said bearing table is slidingly supported on said supporting platform.

3. Apparatus according to claim 1 wherein said feeling means comprises an arm fixed to said basement of the rotating and translating device, a piston supported on said arm and a rod slidingly engaged to said piston, a detection feeler being secured to the end of the rod, said feeler electrically controlling said motor for shifting said bearing table.

4. Apparatus according to claim 1 wherein the rotational amplitude of the transfer arms is controlled by setting cams.

5. Apparatus according to claim 4, wherein the rotational amplitude of said transfer arms is about 170°.

* * * * *